United States Patent
Yorinaga et al.

(10) Patent No.: US 7,209,441 B2
(45) Date of Patent: Apr. 24, 2007

(54) ASYNCHRONOUS TRANSFER MODE SWITCH

(75) Inventors: Tomoyuki Yorinaga, Tokyo (JP); Shigeo Takahashi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 982 days.

(21) Appl. No.: 09/929,367

(22) Filed: Aug. 15, 2001

(65) Prior Publication Data

US 2002/0021668 A1 Feb. 21, 2002

(30) Foreign Application Priority Data

Aug. 15, 2000 (JP) .............................. 2000-246373

(51) Int. Cl.
*H04L 12/56* (2006.01)

(52) U.S. Cl. .................... 370/233; 370/235; 370/395.2

(58) Field of Classification Search ........ 370/412–418, 370/395.51, 395.52, 395.6, 395.61, 395.64, 370/229–236, 396–399, 395.2; 709/235
See application file for complete search history.

(56) References Cited

U.S. PATENT DOCUMENTS

| 5,694,554 | A | | 12/1997 | Kawabata et al. |
| 5,771,231 | A | * | 6/1998 | Watanabe .................... 370/377 |
| 5,790,770 | A | * | 8/1998 | McClure et al. ............. 709/231 |
| 6,275,494 | B1 | * | 8/2001 | Endo et al. ............. 370/395.52 |

(Continued)

FOREIGN PATENT DOCUMENTS

JP 8-125668 5/1996

(Continued)

OTHER PUBLICATIONS

Zhang et al, "Integrated Rate and Credit Feedback Control for ABR Service in ATM Networks", IEEE, 1997, pp. 1295-1303.*

(Continued)

*Primary Examiner*—Hassan Kizou
*Assistant Examiner*—Habte Mered
(74) *Attorney, Agent, or Firm*—Harrity Snyder, LLP

(57) ABSTRACT

The invention provides an ATM switch which realizes hierarchical shaping for each virtual channel and each virtual path with a simple configuration. Cells are sent from cell buffers of an ATM core switch by FIFO operation to output side connection information application sections of output side circuit interfaces. In each of the output side circuit interfaces, the output side connection information application section acquires connection information such as a service class based on an intra-switch connection identification number applied to each cell and applies the connection information to the cell. An output cell buffer queues cells for each virtual channel. A VC cell rate control section reads out cells from the output cell buffer in accordance with the connection information and performs traffic priority control and rate control of the cells to be outputted. Cells of each virtual channel are outputted at a rate equal to or higher than a minimum cell rate but equal to or lower than a peak cell rate in accordance with a VP cell rate control signal representative of the cell storage amount in a VP cell rate control section in the following stage. The VP cell rate control section queues cells into a buffer for each virtual path and performs traffic priority control and rate control of the cells.

9 Claims, 6 Drawing Sheets

U.S. PATENT DOCUMENTS

| | | |
|---|---|---|
| 6,324,165 B1 | 11/2001 | Fan et al. |
| 6,389,026 B1 * | 5/2002 | Kozaki et al. ............... 370/398 |
| 6,512,741 B1 | 1/2003 | Kohzuki et al. |
| 6,526,024 B1 * | 2/2003 | Spagnolo et al. ............ 370/236 |
| 6,643,293 B1 * | 11/2003 | Carr et al. ................... 370/399 |
| 6,690,678 B1 * | 2/2004 | Basso et al. ................. 370/468 |
| 6,775,287 B1 * | 8/2004 | Fukano et al. ............ 370/395.1 |
| 6,775,293 B1 * | 8/2004 | Robotham et al. ........... 370/412 |
| 2002/0054568 A1 * | 5/2002 | Hoogenboom et al. .. 370/235.1 |

FOREIGN PATENT DOCUMENTS

| | | |
|---|---|---|
| JP | 8-242233 | 9/1996 |
| JP | 9-247166 | 9/1997 |
| JP | 10-294741 | 11/1998 |
| JP | 11-88374 | 3/1999 |
| JP | 11-136252 | 5/1999 |
| JP | 2000-31974 | 1/2000 |
| WO | WO 97/04543 | 2/1997 |

OTHER PUBLICATIONS

Lihong et al, "Rate-based Traffic Control Technique in Credit Style for ABR Service in ATM Networks", IEEE, 1998, pp. 1-5.*

* cited by examiner

FIG. 3

INPUT SIDE CONNECTION INFORMATION TABLE

| INPUT CIRCUIT NUMBER/VPI/VCI | SERVICE CLASS | MINIMUM CELL RATE | OUTPUT SWITCH PORT NUMBER | INTRA-SWITCH CONNECTION IDENTIFICATION NUMBER |
|---|---|---|---|---|
| 0/0/32 | 0 | 1200 | 0 | 1000 |
| 0/0/33 | 1 | 100 | 4 | 2000 |
| ⋮ | ⋮ | ⋮ | ⋮ | ⋮ |
| — — — | — | — | — | — |

FIG. 6

OUTPUT SIDE CONNECTION INFORMATION TABLE

| INTRA-SWITCH CONNECTION IDENTIFICATION NUMBER | SERVICE CLASS | VC MINIMUM CELL RATE | VC PEAK CELL RATE | VP PEAK CELL RATE | OUTPUT CIRCUIT NUMBER | OUTPUT VPI/VCI |
|---|---|---|---|---|---|---|
| 1000 | 0 | 1200 | 2000 | 6000 | 0 | 0/32 |
| 2000 | 1 | 100 | 200 | 600 | 2 | 0/33 |
| ... | ... | ... | ... | ... | ... | ... |
| — | — | — | — | — | — | — |

ASYNCHRONOUS TRANSFER MODE SWITCH

BACKGROUND OF THE INVENTION

1. Field of the Invention

The present invention relates to an ATM (Asynchronous Transfer Mode) switch, and more particularly to an ATM switch which performs cell rate shaping of changing the output rate dynamically for each virtual channel (VC) and for each virtual path (VP) in response to a stored amounts of cells.

2. Description of the Related Art

Conventionally, an ATM switch has a cell rate shaping function on the output cell buffer side and output cells with the peak cell rate controlled for each virtual channel or virtual path.

It is sometimes desired to achieve minimum cell rate assurance of each virtual channel (VC) of a virtual path (VP) and peak cell rate shaping of the virtual path and each virtual channel of the virtual path on condition of $\Sigma$ (VCMCR)$\leqq$ VPPCR$\leqq\Sigma$ (VCPCR) where $\Sigma$ (VCP CR) is the peak cell rate total value 20 of the virtual channels in the virtual path, $\Sigma$ (VCMCR) is the minimum cell rate total value of the virtual channels in the virtual path, and VPPCR is the peak cell rate of the virtual path. However, with a conventional shaper, if cell rate shaping is performed for each virtual path, then it is impossible to realize minimum cell rate assurance and peak cell rate shaping of each virtual channel in a virtual path.

Also it seems a possible method to use two conventional shapers connected in two stages such that the peak cell rate is controlled for each virtual channel in the preceding stage whereas the peak cell rate is controlled for each virtual path in the succeeding stage. However, in order to realize the minimum cell rate assurance for each virtual channel in both of the two stages, complicated feedback control to the input cell buffer side is required, and even if the minimum cell rate assurance is realized, a high cost is required disadvantageously.

SUMMARY OF THE INVENTION

An aspect of the present invention provides an ATM switch which realizes hierarchical shaping for each virtual channel and each virtual path with a simple configuration.

In one aspect of the present invention, the output rate for each virtual channel is changed dynamically within a range from a minimum cell rate to a peak cell rate in accordance with a stored amount of cells by rate shaping for each virtual path.

More particularly, according to the present invention, there is provided an ATM switch, comprising one or more input side circuit interfaces, one or more output side circuit interfaces, and an ATM core switch for outputting cells inputted thereto from the input side circuit interface or interfaces to the output side circuit interface or interfaces, each of the output side circuit interfaces feeding back a cell number accumulated for each virtual channel to a corresponding one of the input side circuit interfaces, each of the input side circuit interfaces shaping the rate of cells based on the feedback from a corresponding one of the output side circuit interfaces so that a peak cell rate total value of virtual channels which belong to a virtual path may not exceed a peak cell rate of the virtual path, each of the output side circuit interfaces controlling, based on the cell number accumulated for each virtual channel, so that the peak cell rate of the virtual path to which the virtual channels belong may not exceed the peak cell rate total value of the virtual channels which belong to the virtual path.

Each of the input side circuit interfaces may include a physical layer processing section which terminates a cell, and an input virtual channel cell rate control section for receiving the cell terminated by the physical layer processing section and controlling the rate of cell for each virtual channel based on the feedback.

Each of the output side circuit interfaces may include an output virtual channel cell rate control section for storing a cell number accumulated for each virtual channel, an output virtual path cell rate control section for controlling the cell rate for each virtual channel based on the cell number accumulated in the output virtual channel cell rate control section, and a physical layer section for outputting a cell from the output virtual channel cell rate control section to a circuit, the output virtual channel cell rate control section feeding back the cell number to the input virtual channel cell rate control section.

The ATM core switch may include multiplexing means for multiplexing cells from all of the output side circuit interface sections, filter means for comparing output port identification numbers applied to the cells with output port numbers of the filter means themselves and passing there through only those cells which exhibit coincidence in the comparison, and a cell buffer of the first-in first-out type provided for each output port for temporarily storing those cells which have passed through the corresponding filter means, converting the rate of the cells and outputting the resulting cells to a corresponding one of the output side circuit interfaces.

Preferably, the input cell rate control section stores an input circuit number, a service class, a minimum cell rate, an output switch port number and an intra-switch connection identification number of contents of a contract concluded in advance in a corresponding relationship to a virtual path identifier/virtual channel identifier of an input cell.

Preferably, the output virtual channel cell rate control section stores a service class, a virtual channel minimum cell rate, a virtual channel peak cell rate, a virtual path peak cell rate, an output circuit number and an output virtual path identifier/virtual channel identifier of contents of a contract concluded in advance in a corresponding relationship to an intra-switch connection identification number of each cell.

With the ATM switch, hierarchical shaping for each virtual channel and for each virtual path can be achieved with a simple configuration and control.

The above features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 3 is a diagrammatic view illustrating an input side connection information table illustrated in FIG. 2;

FIG. 6 is a diagrammatic view illustrating an output side connection information table illustrated in FIG. 5.

DESCRIPTION OF THE PREFERRED EMBODIMENTS

Figure 1:
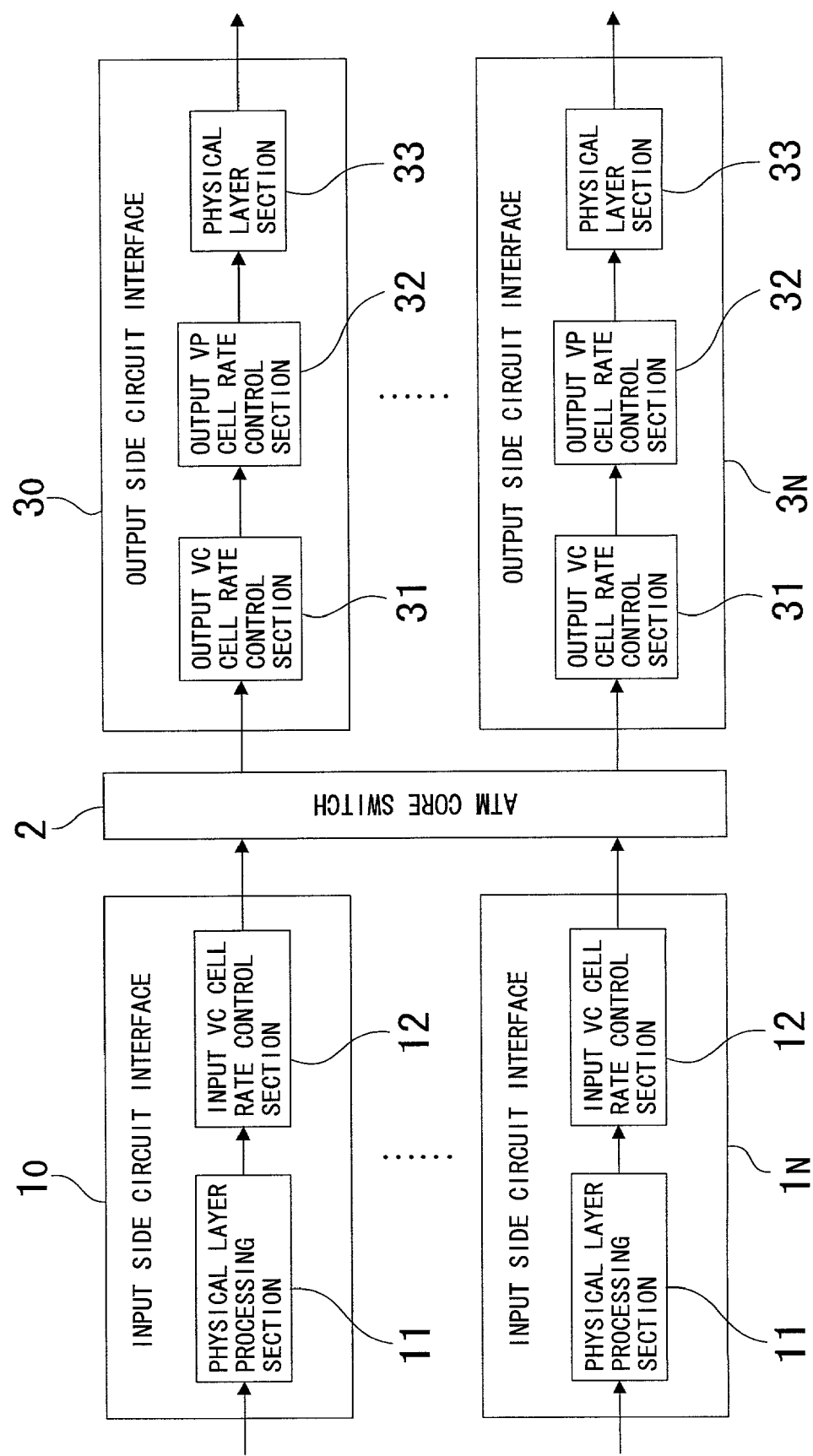
FIG. 1 is a block diagram of an ATM switch to which the present invention is applied.

Referring first to FIG. 1, there is shown an ATM switch to which the present invention is applied. The ATM switch shown includes a plurality of input side circuit interfaces $1_0$ to $1_N$, an ATM core switch 2, and a plurality of output side circuit interfaces $3_0$ to $3_N$.

Each of the input side circuit interfaces $1_0$ to $1_N$ includes a physical layer processing section 11 and an input VC cell rate control section 12. The physical layer processing section 11 terminates cells and sends the cells to the input VC cell rate control section 12. The input VC cell rate control section 12 controls the rate of cells for each virtual channel based on feedback.

Each of the output side circuit interfaces $3_0$ to $3_N$ includes an output VC cell rate control section 31 for storing a number of cells stored for each virtual channel, an output VP cell rate control section 32 for controlling the cell rate for each virtual path based on the number of cells stored in the output VC cell rate control section 31, and a physical layer section 33 for outputting cells from the output VP cell rate control section 32 to a circuit. The output VC cell rate control section 31 feeds back a cell number to the input VC cell rate control section 12.

Figure 2:
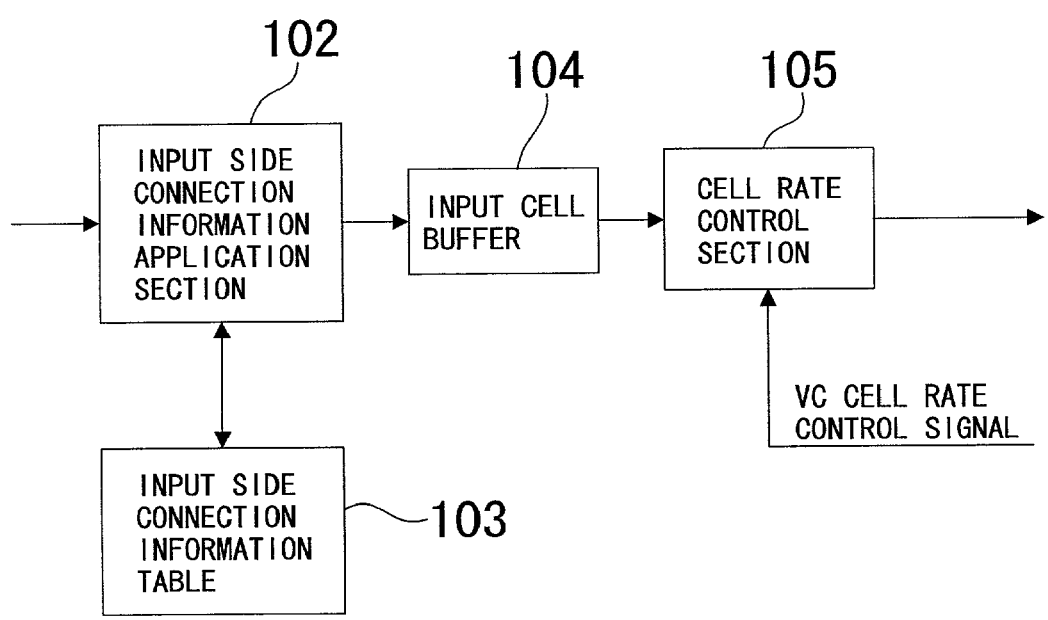
FIG. 2 is a block diagram of a VC cell rate control section of an input side circuit interface shown in FIG. 1.

FIG. 2 shows a configuration of the input VC cell rate control section 12 of the input side circuit interfaces $1_0$ to $1_N$. Referring to FIG. 2, the input VC cell rate control section 12 includes an input side connection information application section 102, an input side connection information table 103, an input cell buffer 104 and a cell rate control section 105.

The input side connection information application section 102 acquires, based on an input circuit number and the VPI (Virtual Path Identifier)/VCI (Virtual Channel Identifier) of the header of a cell, connection information such as a service class, a minimum cell rate, an output switch port number and an intra-switch connection identification number of the cell from the input side connection information table 103.

The input cell buffer 104 queues cells for each virtual channel.

The cell rate control section 105 performs traffic priority control and rate control of cells of reading out cells from the input cell buffer 104 in accordance with connection information applied to the cells and outputting the cells to the ATM core switch 2.

Cells of each virtual channel are outputted at a rate equal to or higher than the minimum cell rate in accordance with a VC cell rate control signal representative of the cell storage amount in each of the output side circuit interfaces $3_0$ to $3_N$.

FIG. 3 illustrates an example of the input side connection information table 103. The input side connection information table 103 illustrated has stored in advance therein an input circuit number, a service class, a minimum cell rate, an output switch port number and an intra-switch connection identification number of contents of a contract concluded in advance.

Figure 4:
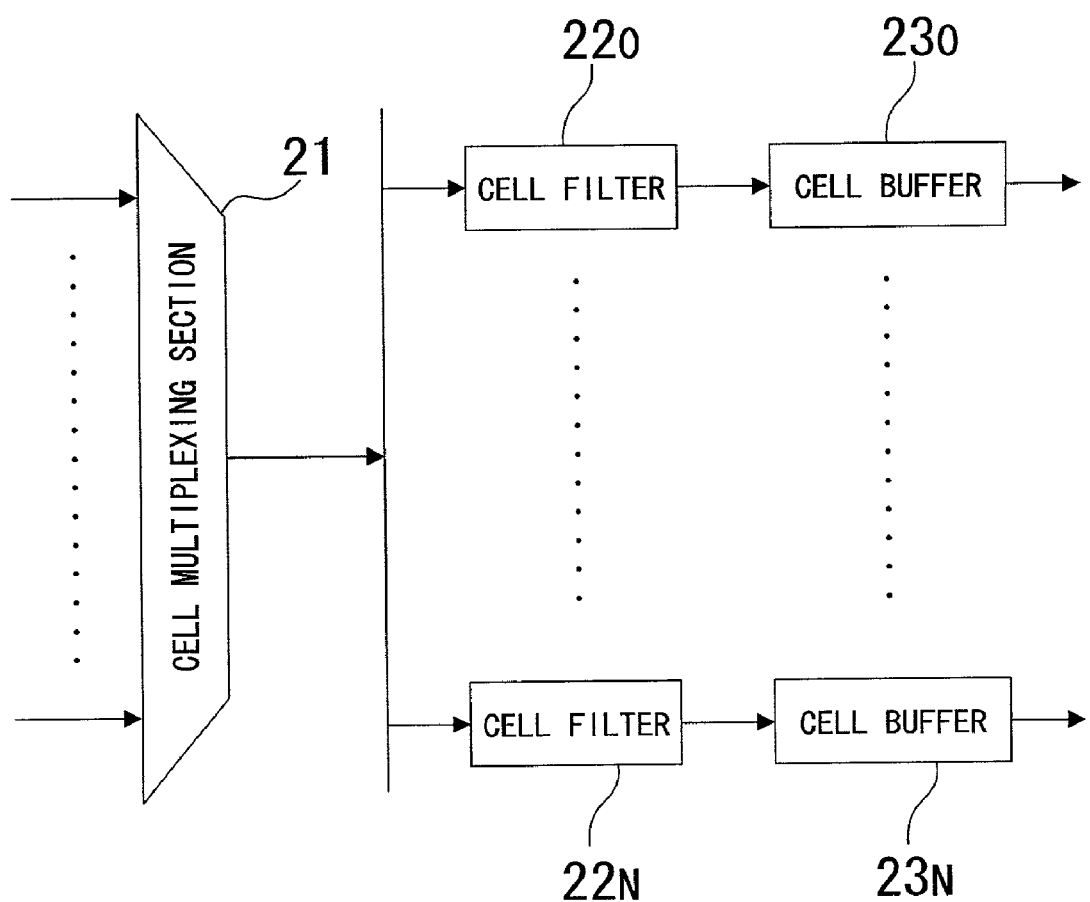
FIG. 4 is a block diagram of an ATM core switch shown in FIG. 1.

FIG. 4 shows a configuration of the ATM core switch 2. Referring to FIG. 4, the ATM core switch 2 shown includes a cell multiplexing section 21, a plurality of cell filters $22_0$ to $22_N$, and a plurality of cell buffers $23_0$ to $23_N$ connected to the output sides of the cell filters $22_0$ to $22_N$, respectively.

The cell multiplexing section 21 multiplexes all cells from all of the input side circuit interfaces $1_0$ to $1_N$ and outputs the multiplexed cells to a high speed bus. The cell filters $22_0$ to $22_N$ compare output port identification numbers applied to cells with output port numbers of the cell filters themselves and pass therethrough only those cells which indicate coincidence in the comparison. The cell buffers $23_0$ to $23_N$ temporarily store those cells, which have passed through the corresponding cell filters $22_0$ to $22_N$, for the individual output ports, convert the rates of the cells and output the cells to the output side circuit interfaces $3_0$ to $3_N$ through FIFO operation, respectively.

Figure 5:
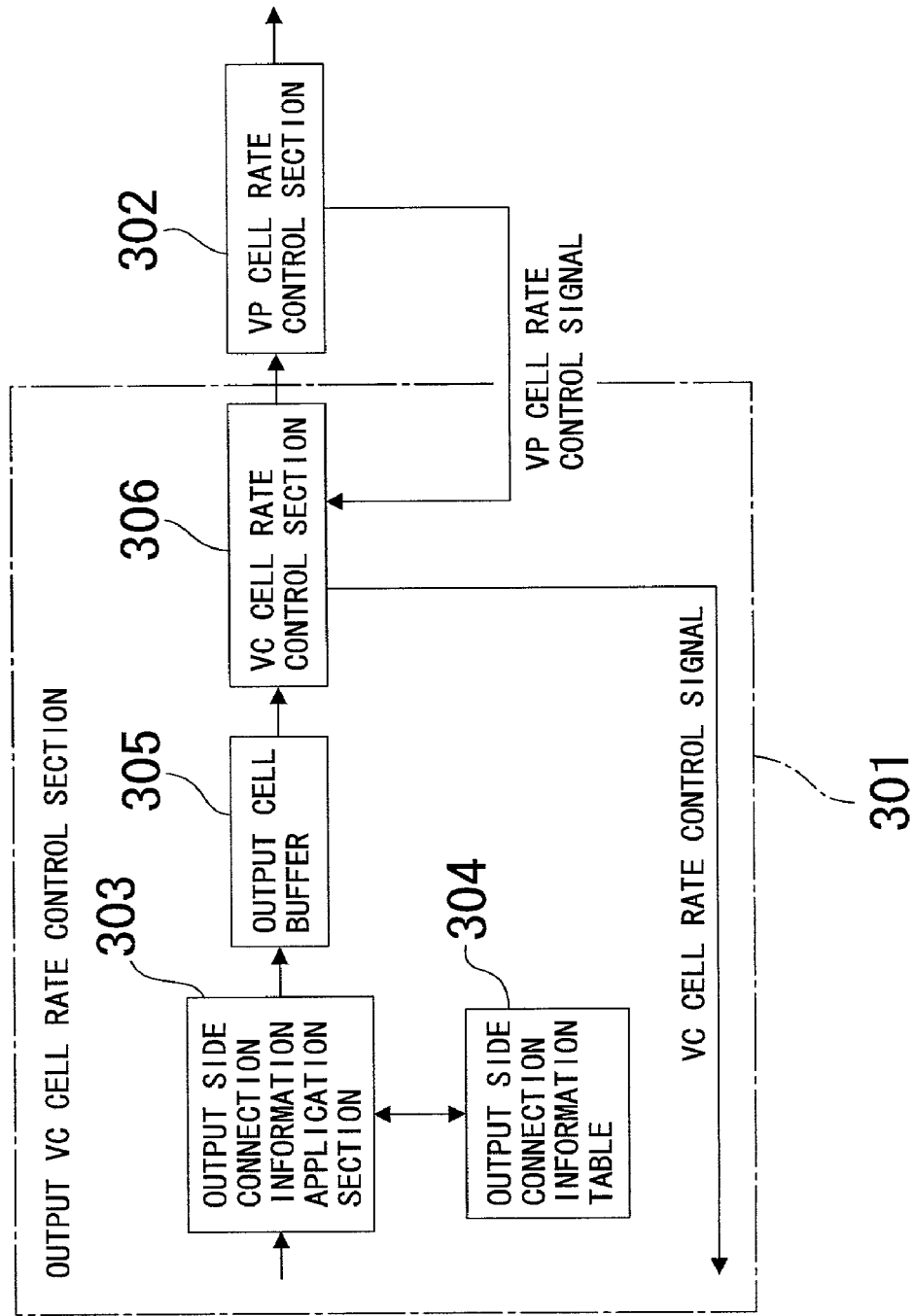
FIG. 5 is a block diagram of a VC cell rate control section and a VP cell rate control section of an output side circuit interface shown in FIG. 1.

FIG. 5 shows a detailed configuration of the output VC cell rate control section 31 together with the output VP cell rate control section 32 of the output side circuit interfaces $3_0$ to $3_N$ described hereinabove with reference to FIG. 1. It is to be noted that, in FIG. 5, the output VC cell rate control section 31 and the output VP cell rate control section 32 are represented as output VC cell rate control section 301 and VP cell rate control section 302, respectively. Referring to FIG. 5, the output VC cell rate control section 301 includes an output side connection information application section 303, an output side connection information table 304, an output cell buffer 305, and a VC cell rate control section 306.

The output side connection information application section 303 acquires connection information of a cell such as a service class, a VC minimum cell rate, a VC peak cell rate, a VP peak cell rate, an output circuit number and an output VPI/VCI based on an intra-switch connection identification number applied to the cell from the output side connection information table 304, and applies the acquired connection information to the cell.

The output cell buffer 305 queues cells for each virtual channel.

The VC cell rate control section 306 reads out cells from the output cell buffer 305 in accordance with connection information applied to the cells and performs traffic priority control and rate control of the cells to be outputted. Cells of each virtual channel are outputted at a rate equal to or higher than the minimum cell rate but equal to or lower than the peak cell rate in accordance with a VP cell rate control signal representative of the cell storage amount in the VP cell rate control section 302 in the next stage.

The VP cell rate control section 302 queues cells into a buffer for each virtual path, reads out the cells from the buffer in accordance with connection information applied to the cells, and performs traffic priority control and rate control of the cells to be outputted to a circuit. Cells of each virtual path are outputted at a rate equal to or lower than the peak cell rate.

FIG. 6 illustrates an example of the output side connection information table 304. The output side connection information table 304 illustrated has stored therein, in a corresponding relationship to an intra-switch connection identification number of an input cell inputted from the ATM core switch 2, a service class, a VC minimum cell rate, a VC peak cell rate (VCPCR), a VP peak cell rate (VPPCRVCP), an output circuit number and an output VPI/VCI of contents of a contract concluded in advance.

Now, cell rate shaping operation of the ATM switch of the present embodiment is described.

In each of the input side circuit interfaces $1_0$ to $1_N$, a cell from a circuit is terminated by the physical layer processing section 11 and inputted to the input VC cell rate control section 12.

In the input VC cell rate control section 12, the input side connection information application section 102 refers to the input side connection information table 103 to apply, based on the input circuit number and the VPI/VCI of the header of the cell, connection information such as a service class, a minimum cell rate, a switch output port identification number and an intra-switch connection identification number to the cell.

The input circuit number is required in order to accommodate a plurality of circuits, in the present case, N+1 circuits, using the plurality of input side circuit interfaces $1_0$ to $1_N$.

The input cell buffer 104 queues cells for each virtual channel.

The cell rate control section 105 reads out cells from the input cell buffer 104 in accordance with the connection information applied to the cells and performs traffic priority control and rate control of the cells to be outputted to the ATM core switch 2. A VC cell rate control signal is fed back to the cell rate control section 105 from the output VC cell rate control section 31 of a corresponding one of the output side circuit interfaces $3_0$ to $3_N$. The cell rate control signal represents a cell storage amount in the corresponding one of the output side circuit interfaces $3_0$ to $3_N$.

Each of the input side circuit interfaces $1_0$ to $1_N$ performs minimum cell rate assurance of virtual channels and peak cell rate shaping of a virtual path and the virtual channels on condition of $\Sigma$ (VCMCR)$\leq$VPPCR$\leq\Sigma$ (VCPCR) in accordance with a cell rate control signal from a corresponding one of the output side circuit interfaces $3_0$ to $3_N$. In other words, cells of each virtual channel are outputted at a rate equal to or higher than the minimum cell rate in accordance with a VC cell rate control signal.

The ATM core switch 2 multiplexes all cells from all of the input side circuit interfaces $1_0$ to $1_N$ and outputs the multiplexed cells to the high speed bus. In this instance, each of the cell filters $22_0$ to $22_N$ in the ATM core switch 2 compares the switch output port identification number applied to each cell with the output port number of the cell filter itself and passes therethrough only those cells which exhibit coincidence in the comparison.

The cell buffers $23_0$ to $23_N$ temporarily store cells having passed through the cell filters $22_0$ to $22_N$ for the individual output ports, perform rate conversion of the cells and output the cells to the output side circuit interfaces $3_0$ to $3_N$ through FIFO operation, respectively.

The output side connection information application section 303 in each of the output side circuit interfaces $3_0$ to $3_N$ refers to the output side connection information table 304 to acquire connection information of each cell such as a service class, a VC minimum cell rate, a VC peak cell rate, a VP peak cell rate, an output circuit number and an output VPI/VCI based on the intra-switch connection identification number applied to the cell and applies the connection information to the cell.

The output cell buffer 305 queues cells for each virtual channel.

The VC cell rate control section 306 reads out cells from the output cell buffer 305 in accordance with connection information applied to the cells and performs traffic priority control and rate control of the cells to be outputted. Cells of each virtual channel are outputted at a rate equal to or higher than the minimum cell rate but equal to or lower than the peak cell rate in accordance with a VP cell rate control signal representative of the cell rate storage amount in the VP cell rate control section 302 in the following stage.

The VP cell rate control section 302 queues cells into a buffer for each virtual path, reads out the cells from the buffer in accordance with the connection information applied to the cells, and performs traffic priority control and rate control of cells to be outputted to a circuit. Cells of each virtual path are outputted at a rate equal to or lower than the peak cell rate.

While a preferred embodiment of the present invention has been described using specific terms, such description is for illustrative purpose only, and it is to be understood that changes and variations may be made without departing from the spirit or scope of the following claims.

What is claimed is:

1. A switch, comprising:
   one or more input side circuit interfaces;
   one or more output side circuit interfaces; and
   a core switch for outputting cells inputted thereto from said input side circuit interface or interfaces to said output side circuit interface or interfaces;
   each of said output side circuit interfaces feeding back a cell number accumulated for each virtual channel to a corresponding one of said input side circuit interfaces;
   each of said input side circuit interfaces shaping the rate of cells based on the feedback from a corresponding one of said output side circuit interfaces so that a peak cell rate total value of virtual channels which belong to a virtual path may not exceed a peak cell rate of the virtual path;
   each of said output side circuit interfaces controlling, based on the cell number accumulated for each virtual channel, so that the peak cell rate of the virtual path to which the virtual channels belong may not exceed the peak cell rate total value of the virtual channels which belong to the virtual path.

2. The switch as claimed in claim 1, wherein each of said input side circuit interfaces includes a physical layer processing section which terminates a cell, and an input virtual channel cell rate control section for receiving the cell terminated by said physical layer processing section and controlling the rate of cell for each virtual channel based on the feedback.

3. The switch as claimed in claim 2, wherein each of said output side circuit interfaces includes an output virtual channel cell rate control section for storing a cell number accumulated for each virtual channel, an output virtual path cell rate control section for controlling the cell rate for each virtual channel based on the cell number accumulated in said output virtual channel cell rate control section, and a physical layer section for outputting a cell from said output virtual channel cell rate control section to a circuit, said output virtual channel cell rate control section feeding back the cell number to said input virtual channel cell rate control section.

4. The switch as claimed in claim 1, wherein said core switch includes multiplexing means for multiplexing cells from all of said output side circuit interface sections, filter means for comparing output port identification numbers applied to the cells with output port numbers of said filter means themselves and passing therethrough only those cells which exhibit coincidence in the comparison, and a cell buffer of the first-in first-out type provided for each output port for temporarily storing those cells which have passed through the corresponding filter means, converting the rate of the cells and outputting the resulting cells to a corresponding one of said output side circuit interfaces.

5. The switch as claimed in claim 2, wherein said input cell rate control section stores an input circuit number, a service class, a minimum cell rate, an output switch port number and an intra-switch connection identification number of contents of a contract concluded in advance in a corresponding relationship to a virtual path identifier/virtual channel identifier of an input cell.

6. The switch as claimed in claim 3, wherein said output virtual channel cell rate control section stores a service class, a virtual channel minimum cell rate, a virtual channel peak cell rate, a virtual path peak cell rate, an output circuit number and an output virtual path identifier/virtual channel identifier of contents of a contract concluded in advance in a corresponding relationship to an intra-switch connection identification number of each cell.

7. A switch comprising:
 an input processing section configured to:
  receive cells via a plurality of virtual channels (VCs) of a virtual path (VP), and
  output cells for each VC at a rate equal to or higher than a minimum cell rate based on a control signal; and
 an output processing section configured to:
  store the cells from the input processing section for each VC,
  determine a number of stored cells for each VC,
  generate the control signal, the control signal indicating the determined number of cells stored for each VC,
  transmit the control signal to the input section,
  determine a number of stored cells for the VP,
  shape a transmission of the cells from the output processing section based on a peak cell rate of the VP.

8. The switch of claim 7 wherein the input processing section is further configured to:
 associate, with each received cell, an intra-switch identification number, and
 wherein the output processing section being further configured to:
  identify connection information for each cell based on the intra-switch identification number associated with each cell.

9. The switch of claim 7 further comprising:
 a core switch positioned between the input processing section and the output processing section, the core switch including:
  a multiplexing section connected to the input processing section,
  a filter connected to the multiplexing section, and
  a buffer connected to the filter and the output processing section.

* * * * *